March 14, 1967 J. LA MARCA 3,308,696
LATHE LIVE CENTER
Filed March 3, 1965
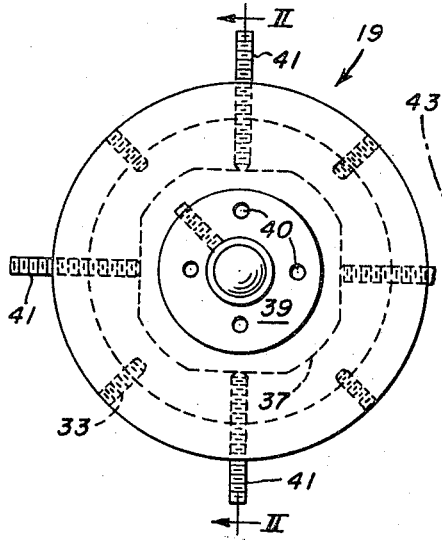
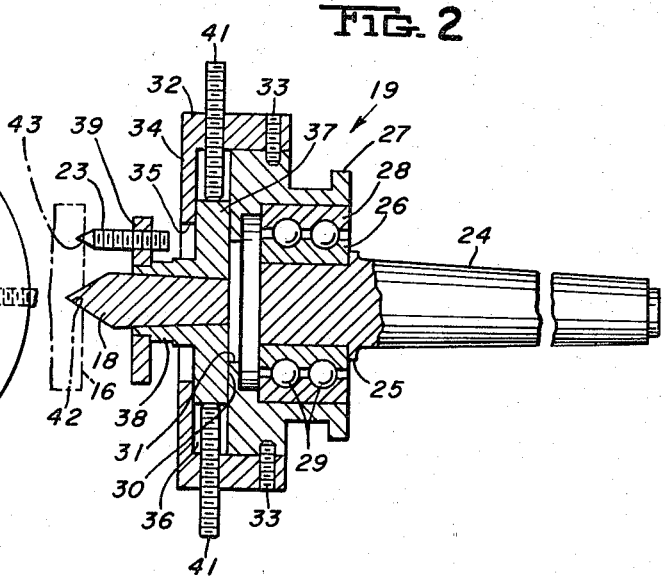
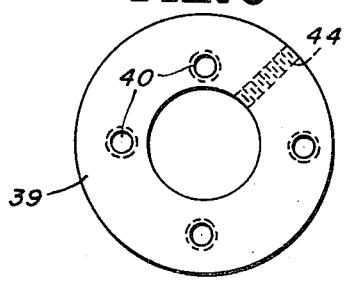
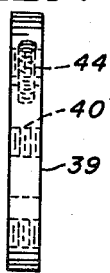
INVENTOR.
John LaMarca
BY
Attorneys United States Patent Office 3,308,696
Patented Mar. 14, 1967

3,308,696
LATHE LIVE CENTER
John La Marca, 1312 Dormont Ave.,
Pittsburgh, Pa. 15216
Filed Mar. 3, 1965, Ser. No. 436,815
4 Claims. (Cl. 82—33)

This invention relates to a live center for use on lathes.

In a lathe such as an engine lathe there is a head stock at one end of the lathe bed which includes a power driven spindle for turning a lathe chuck. The chuck has movable jaws for holding one end of a workpiece in the lathe. At the opposite end of the bed there is a tail stock adjustable towards and away from the head stock to accommodate various length workpieces. The tail stock has a center in alignment with the center of rotation of the head stock and engages the end of the workpiece. Generally, the tail stock center pin is tapered to a sharp point which fits into a corresponding recess formed in the end of the workpiece. This tail stock center may be "live" or "dead," depending on whether or not it rotates with the workpiece.

After a recess or center hole is drilled in the end of a workpiece, the machining is performed and the end of the piece with the center hole is in many cases cut off. It frequently happens that a piece to be machined does not permit this to be done. In other cases the workpiece may be bent out of alignment with the head and tail stock of the lathe, in which case it is necessary to perform a forging operation to straighten the piece so that it may be positioned between the head and tail stock.

In turning eccentrics it is necessary to displace the axis of the workpiece from the axis of rotation of the lathe. Since the tail stock center of a lathe is not movable in all directions transversely of the axis of rotation, an eccentric cannot be conveniently turned except by establishing a false center. This is because the axis of the workpiece can only be offset at the head stock end by means of the chuck jaws, while the tail stock center otherwise remains fixed, so that only a taper can be turned but not an eccentric.

The live center of the present invention is provided with a tapered shaft which fits into the tail stock and replaces the conventional center pin. The body of the live center is rotatable on the shaft and has a plate member which is slidable in all directions transversely of the shaft axis. The center which engages the workpiece is carried by and extends outwardly from the sliding plate. There is also a lock center pin radially offset from the main center and is carried by a flange on the outer end of the sliding plate. This lock center is adjustable in various positions and engages the workpiece at a point radially offset from the main center and aids in holding the piece firmly in place and in transmitting rotation from the workpiece to the live center. The sliding plate is adjustable in various positions by means of a plurality of set screws circumferentially spaced around the plate. By adjusting these set screws, the "throw" or amount of offset can be varied.

The live center of the present invention may advantageously be used in conjunction with a lathe tool as described in my co-pending application Ser. No. 584,461 filed Oct. 5, 1966, which application is a division of the present application as originally filed.

An object of the present invention is to provide an improved metal turning lathe accessory.

Another object is to provide an improved means for the selective positioning of a workpiece with respect to the axis of rotation, or with respect to the turning axis of the lathe.

Another object is to provide an improved live center for use on a lathe.

These and other objects will be readily apparent and more fully understood by reference to the following description, wherein:

FIG. 1 is an end elevation of a live center according to the invention;

FIG. 2 is a side elevation of the live center of FIG. 1 taken along the line II—II of FIG. 1;

FIGS. 3 and 4 show the lock center holder in detail.

Referring to the drawings, the tools are shown to advantage in the various views wherein like numerals indicate like parts throughout.

In FIGS. 1 and 2 the live center accessory is indicated generally as 19. It comprises a shaft 24 having a tapered end which is held in the tail stock end of a lathe in a manner well-known in the art. Longitudinally spaced from the end opposite the tapered end there is a collar 25. On the same end of the shaft 24 there is an inner bearing raceway 26 circumposed about the shaft and abutting the collar 25. Concentric with the shaft and inner raceway there is a generally cylindrical hollow member or body 27 having secured to its inner wall an outer bearing raceway 28 arranged so that the two raceways 26 and 28 cooperate to retain a plurality of ball bearings 29. The end of the body member 27 extends beyond the end of the shaft 24 and has an end wall 30 with an opening 31 therethrough. Concentric with the body 27 there is an outer or cover member 32 removably fixed on the body 27 by any suitable means such as clamping screws 33. The cover extends beyond the end wall 30 of member 27 and has a wall 34 with a center opening 35 therethrough. The walls 30 and 34 are thereby longitudinally spaced, forming a space 36 therebetween for receiving a sliding plate or center holder 37. This holder is slidably disposed in the space 36 between the walls 30 and 34 and has a tubular extension 38 projecting outwardly beyond the plane of the wall 34 of the cover 32. The tubular extension 38 has a reduced outer diameter around its outer edge to provide a seating surface for an annular flange 39 which flange has a plurality of threaded holes 40 for receiving a lock center pin 23. The main center pin 18 is disposed in the tubular portion 38 of the center pin holder 37. Spaced around the periphery of the cover 32 are a plurality of radial set screws 41 threaded through the side walls of the cover 32 to project into the space 36 in abutting relation to the center pin holder 37. The plate 37 is preferably flat sided so that it cannot rotate and by having calibration on its face visible through the opening 35 one can see the extent to which the plate is moved from center.

When constructed and assembled as I described, it will be seen that the shaft 24 can be inserted and held in the tail stock of a lathe and that the live center assembly is free to rotate about the shaft 24 on the bearings 29. By adjusting the set screws 41 the center pin 18 may be offset from the longitudinal center line of the shaft 24 in any direction so as to correspond to the direction in which the other end of the workpiece is offset from center in the chuck. The end of a workpiece 16 (shown in dotted lines in FIG. 4) may be prepared with two recesses or tap holes 42 and 43 for engagement with the main center pin 18 and lock center pin 23, respectively. With the other end of the workpiece in the chuck at the head stock and the center pins 18 and 23 in the recesses 42 and 43, it is obvious that the live center rotates with the piece 16 about the shaft 24 by rotation transmitted through the locking pin 23 and the locking pin assures against the workpiece rotating relatively to the center pin 18.

As seen in FIGS. 3 and 4 the flange 39 which holds the lock center has a plurality of threaded openings 40 spaced at varying radii from the main center 18. This is not an essential feature but I have found it is convenient because the tap hole for the lock center need not be so exactly located. With the extra threaded openings, the lock center pin 23 may easily be shifted to a different position which more closely matches the tap hole spacing on the end of the workpiece. The flange 39 is held on the extension 38 by means of a set screw 44 or the like.

It will be apparent to those skilled in the art that various modifications in the construction and arrangement of the parts ar epossible within the scope and spirit of the invention.

I claim:
1. A live center assembly for a lathe, comprising,
   (a) a shaft,
   (b) a housing rotatably mounted on one end of the shaft, the housing having spaced outer and inner end walls extending beyond the end of the shaft with an opening through at least the outer end wall,
   (c) a plate slidably disposed in the space between the end walls,
   (d) a center pin mounted on the plate and projecting beyond the plane of the outer end wall, and
   (e) means for adjusting the plate in all directions transversely of the axis of rotation of the housing, whereby the center pin may be offset from a neutral position of alignment with the axis of rotation.

2. The combination as defined in claim 1 wherein the plate has a tubular extension projecting outwardly therefrom in which the center pin is mounted and the adjusting means comprises a plurality of circumferentially spaced set screws passing through the housing into the space between the end walls in abutting relation to the plate.

3. The combination of claim 2 wherein the tubular extension has an annular flange therearound, and a lock center pin mounted on the flange parallel to and radially offset from the first mentioned center pin.

4. The combination as defined in claim 1 wherein the housing comprises
   (a) a first member rotatably mounted on the one end of the shaft with a portion of the first member extending beyond the end of the shaft and forming the inner end wall, and
   (b) a second member secured to the first member for rotation therewith, a portion of the second member extending outwardly beyond the inner wall of the first member to form the outer end wall.

References Cited by the Examiner

UNITED STATES PATENTS

| 2,077,293 | 4/1937 | Weaver | 82—33 |
| 2,131,327 | 9/1938 | Lippard. | |
| 3,177,742 | 4/1965 | Basso | 82—33 X |

WILLIAM W. DYER, JR., *Primary Examiner.*

L. VLACHOS, *Assistant Examiner.*